2,964,544

15-HYDROXY STEROIDS OF THE PREGNANE SERIES AND PROCESS FOR THE PREPARATION THEREOF

Howard J. Ringold, Franz Sondheimer, and George Rosenkranz, Mexico City, Mexico, assignors to Syntex S.A., Mexico City, Mexico, a corporation of Mexico No Drawing. Filed Nov. 24, 1954, Ser. No. 471,098

Claims priority, application Mexico Nov. 30, 1953

19 Claims. (Cl. 260—397.47)

The present invention relates to novel cyclopentanophenanthrene derivatives and to a novel method for the prepartion thereof.

More particularly, the present invention relates to novel steroidal 15-hydroxy $\Delta^4$-3-ketones of the pregnane series possessing the 17 side chain characteristic of the cortical hormone desoxycorticosterone as well as to esters thereof. In addition, the present invention relates to certain novel intermediates for the preparation of the aforementioned compounds.

The final products of the process of the present invention, namely $\Delta^4$-pregnene-15,21-diol-3,20-dione and esters thereof, are useful and vaulable cortical hormones having the characteristic effect on the deposition of liver glycogen and other properties such as anti-inflammatory properties which characterize these hormones.

In accordance with the present invention, it has been discovered that the novel cortical hormone and/or esters thereof, i.e. $\Delta^4$-pregnene-15,21-diol-3,20-dione may be readily prepared by a novel process from the known compound $\Delta^{16}$-pregnene-3$\alpha$-ol-20-one. More specifically, in accordance with the present invention, it has been discovered that $\Delta^{16}$-pregnene-3$\alpha$-ol-20-one upon reaction with formic acid produces the formate which in turn can be converted to the corresponding novel enol acylate, i.e. novel esters of $\Delta^{16,20}$-pregnadiene-3$\alpha$,20-diol.

It has been further discovered, in accordance with the present invention, that the novel enol esters, upon treatment with N-iodosuccinimide, form the corresponding 21-iodo compounds which may be subjected to acetolysis to prepare the corresponding novel esters of $\Delta^{16}$-pregnene-3$\alpha$,21-diol-20-one. Further, upon treatment of the last mentioned esters with 1 mol of bromine followed either by direct acetolysis or by treatment with sodium iodide to substitute iodine in the 15 position and acetolysis, there is then prepared the novel esters of $\Delta^{16}$-pregnene-3$\alpha$,15,21-triol-20-one.

In accordance with the present invention, treatment of the last-mentioned triol or its esters with hydrogen in the presence of a hydrogenation catalyst results in the saturation of the double bond to produce the novel saturated triol intermediate and these intermediates when subjected to oxidation with an aluminum alkoxide in the presence of a hydrogen acceptor, this oxidation involving either the 3-formate derivative or the 3-hydroxy derivative, there is prepared the corresponding 15,21-diesters of pregnane-15,21-diol-3,20-dione. This last compound may then be converted to the corresponding novel 4-bromo derivative and subjected to dehydrobromination to form the desired final product.

The process of the present invention is indicated in the following equation:

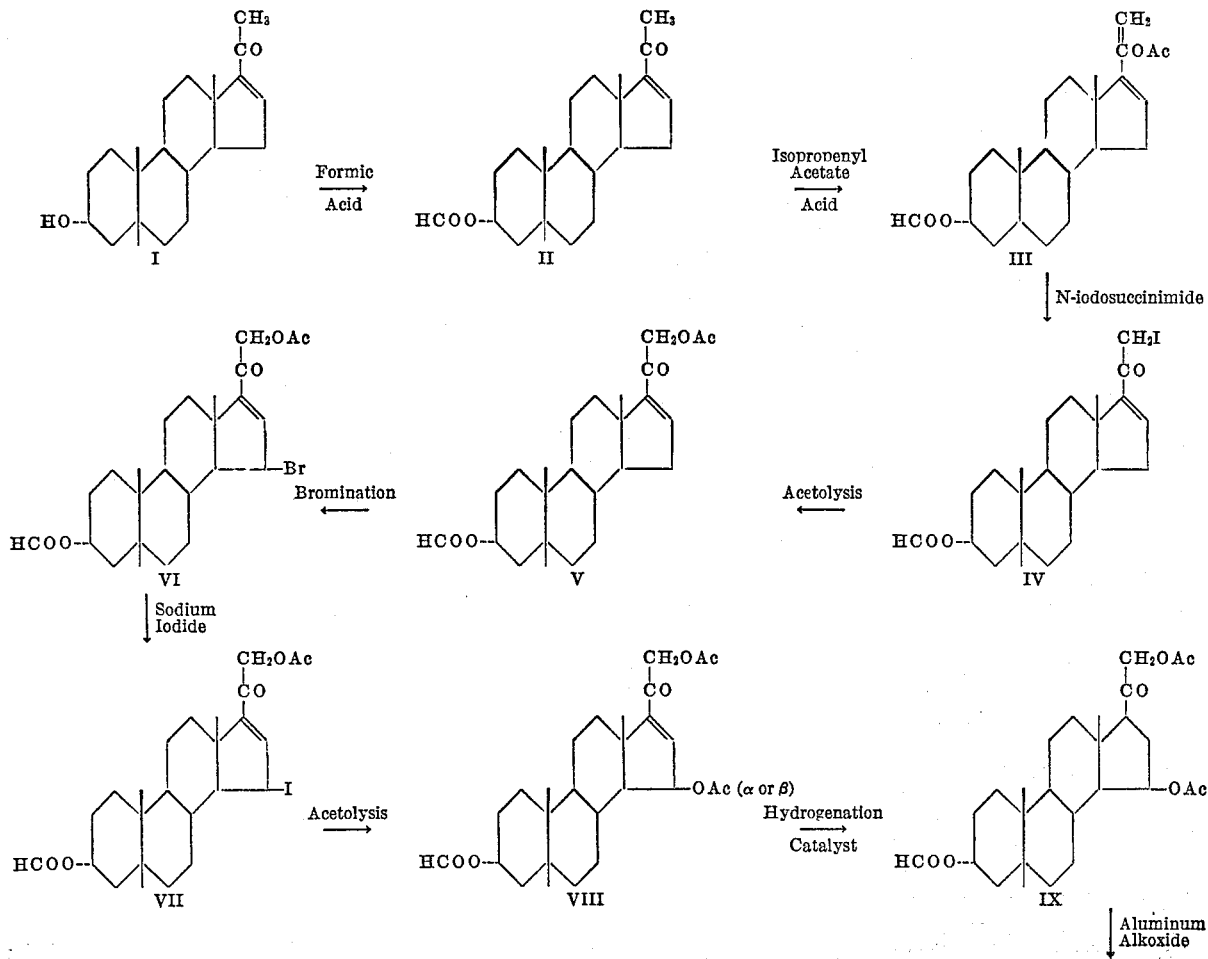

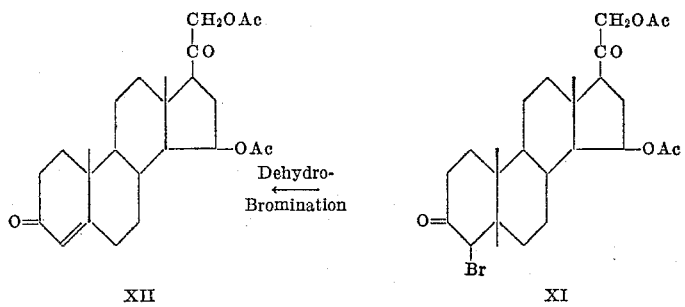 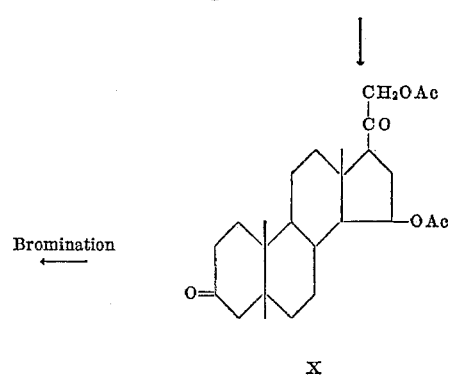

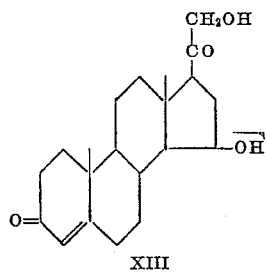

Referring to the above equation Ac represents the acetyl group and it may be noted, as will be hereinafter set forth in detail, that although the acetyl group is indicated in the equation, other acyl groups are also suitable for use in the present reaction and for the production of other esters.

For the production of the formate of $\Delta^{16}$-pregnene-3α-ol-20-one (II), $\Delta^{16}$-pregnene-3α-ol-20-one is suspended in concentrated formic acid and stirred at an elevated temperature for a substantial period of time, i.e. of the order of two hours. Preferably, a temperature of about 60° C. is utilized. The desired formate crystallizes upon cooling the reaction solution.

For the second step of the process the formate of $\Delta^{16}$-pregnene-3α-ol-20-one is preferably dissolved in isopropenyl acetate and refluxed in the presence of an acid catalyst such as p-toluenesulfonic acid. As may be understood, other methods for the formation of enol acylates may be utilized, as for example, the use of other isopropenyl compounds of lower fatty acids. Preferably, the reflux condition is maintained with slow distillation for a substantial period of time, i.e. of the order of ten hours, with the addition of more isopropenyl acetate in order to keep the volume of the solution at a constant. Purification and recrystallization yielded the 3-formate 20-acetate of $\Delta^{16,20}$-pregnadiene-3α,20-diol (III).

For the third step of the process, i.e. the production of the 21-iodo compound, the mixed ester is dissolved in an inert organic solvent such as dioxan and mixed with N-iodosuccinimide. The mixture is then heated for a substantial period of time, i.e. the order of one hour, at an elevated temperature, such as for example 80° C., and then precipitated by pouring the same into ice water. There is thus prepared the 3-formate 21-iodo derivative of $\Delta^{16}$-pregnene-3α-ol-20-one (IV). For the acetolysis step indicated in the equation, the 21-iodo compound is dissolved in an anhydrous organic solvent, such as acetone, and mixed with alkali metal acylate, preferably an acylate of a lower fatty acid or benzoic acid. An especially preferable compound is anhydrous potassium acetate. Upon refluxing for approximately ten hours, concentration and dilution with water, a precipitate was collected of the 3-formate 21-acetate of $\Delta^{16}$-pregnene-3α,21-diol-20-one. In the event that other acylates are utilized for the reaction as it may be understood, there is formed the corresponding ester, as for example 21-esters of lower fatty acids or benzoic acid.

The compound thus produced (V) is then subjected to bromination with, for example, N-bromosuccinimide in the presence of strong light. Preferably, approximately one molar equivalent of N-bromosuccinimide is utilized, and the resultant compound after purification, is the 3-formate 21-acetate of 15-bromo-$\Delta^{16}$-pregnene-3α,21-diol-20-one (VI). As may be understood, in place of the formate acetate the corresponding 21-lower fatty acid or benzoic acid esters previously referred to may be utilized and the resultant compound is the 3-formate 21-acylate.

The compound prepared in accordance with the previous step (VI) is then subjected to acetolysis either directly or with the previous substitution of iodine as indicated in the compound (VII). For the substitution of iodine in the compound, (VI) is reacted with sodium iodide, although other alkali metal iodides may be utilized. There is thus prepared the 3-formate 21-acetate or acylate of 15-iodo-$\Delta^6$-pregnene-3α,21-diol-20-one. For the acetolysis, either an alkali metal or other monovalent acetate may be utilized. If the acetate of a metal such as silver is used, the resultant 15-acetate has an opposite configuration at C–15, i.e. in one instance the compound is a 15α-acylate and in the other instance a 15β-acylate. Instead of the acetate salts other similar salts may be utilized such as other lower fatty acylates or benzoates. In any event the compound produced is the 3-formate-15, 21-diacylate, specifically the 3-formate 15,21-diacetate of $\Delta^{16}$-pregnene-3α,15,21-triol-20-one (VIII). For the formation of other triesters the triester may be conventionally saponified with mild alkali to give the corresponding free triol, i.e. $\Delta^{16}$-pregnene-3α,15,21-triol-20-one and then conventionally esterified.

To form the saturated compound either the free compound or the ester, indicated by VIII, are subjected to treatment with hydrogen in the presence of a suitable hydrogenation catalyst such as palladium on barium sulfate. There is thusly prepared the corresponding 3-formate 15, 21-diacetate of pregnane-3α,15,21-triol-20-one and in the case where the free compound is utilized or other esters the corresponding free compound or other ester.

For the Oppenauer oxidation of the compound IX, the 3-formate 15,21-diacylate of pregnane-3α,15,21-triol-20-one is dissolved in an inert solvent such as xylene and aluminum alkoxide in the presence of a hydrogen acceptor, preferably a ketone, is then added. Alternatively a 3-hydroxy-15,21-diacylate, obtainable by mild saponification of IX, may be used. The resultant mixture is then refluxed for a short period of time, such as 45 minutes. The resultant compound is the diacetate of pregnane-15,21-diol-3,20-dione (X) or another diacylate. The subsequent steps, involve the bromination of X at the 4 position and dehydrobromination as indicated followed by saponification, to prepare the free final products namely $\Delta^4$-pregnene-15,21-diol-3,20-dione. As may be understood the free final product may then be esterified in a conventional manner to form the corresponding esters.

The following specific examples serve to illustrate but are not intended to limit the present invention:

*Example I*

A suspension of 10 g. of $\Delta^{16}$-pregnene-3α-ol-20-one in 200 cc. of 90% formic acid was stirred for two hours at a temperature of 60° C. Upon cooling of the resulting solution the formate of $\Delta^{16}$-pregnene-3α-ol-20-one crystallized directly. Filtration afforded 7.0 g. of such compound.

*Example II*

A solution of 10 g. of the formate of $\Delta^{16}$-pregnene-3α-ol-20-one in 200 cc. of isopropenyl acetate was refluxed in the presence of 1.5 g. of p-toluenesulfonic acid monohydrate, maintaining a slow distillation in the course of ten hours. During this time the volume of the solution was kept constant by the occasional addition of more isopropenyl acetate. The cooled solution was diluted with benzene, washed with sodium bicarbonate solution and water, dried over sodium sulfate and concentrated to a small volume under reduced pressure. The residue crystallized from acetone-hexane to yield the 3-formate 20-acetate of $\Delta^{16,21}$-pregnadiene-3α,20-diol.

5 g. of the mixed ester thus obtained was dissolved in 12 cc. of dioxane and mixed with 3.5 g. of N-iodosuccinimide. The mixture was heated for 1 hour at 80° C. and then poured into ice water containing 1.6 g. of sodium thiosulfate. The precipitate was collected, washed and recrystallized from methanol, thus giving 4.3 g. of the 21-iodo compound.

4 g. of the 21-iodo compound was dissolved in 125 cc. of anhydrous acetone and mixed with 15 g. of anhydrous potassium acetate. The solution was refluxed for ten hours, concentrated to a small volume and diluted with water. The precipitate was collected and recrystallized from methanol to give 3.2 g. of the 3-formate 21-acetate of $\Delta^{16}$-pregnene-3α,21-diol-20-one. A similar reaction with potassium propionate or benzoate gave the equivalent 21-propionate of benzoate.

*Example III*

5 g. of the formate acetate or other acylate obtained in accordance with Example II was dissolved in 100 cc. of carbon tetrachloride, 2.45 g. of N-bromosuccinimide was added and the mixture was refluxed for 9 minutes while it was being strongly illuminated with the use of two GE–200 w. lamps, which at the same time served as the source of heat. The mixture was cooled, washed with water, dried over sodium sulfate and concentrated under vacuum at a temperature between 20 and 30° C. to give 5.0 g. of the 3-formate 21-acetate of 15-bromo-$\Delta^{16}$-pregnene-3α,21-diol-20-one.

*Example IV*

2.0 g. of sodium iodide was added to a solution of 1.0 g. of the 3-formate 21-acetate of 15-bromo-$\Delta^{16}$-pregnene-3α,21-diol-20-one in 30 cc. of acetone and the mixture was kept standing at room temperature for 12 hours. It was then poured into an aqueous solution of sodium thiosulfate and the precipitate formed was collected. 1.1 g. was obtained of the 3-formate 21-acetate of 15-iodo-$\Delta^{16}$-pregnene-3α,21-diol-20-one.

(a) 4.0 g. of potassium acetate was added to a solution of 1.0 g. of the 15-iodo compound in 10 cc. of acetone and the mixture was stirred for 20 hours at room temperature. Water was added and the precipitate was collected and washed to neutral, thus yielding 0.25 g. of the 3-formate 15,21-diacetate of $\Delta^{16}$-pregnene-3α,15,21-triol-20-one.

(b) Repetition of this experiment using silver acetate instead of potassium acetate afforded 0.25 g. of the 3-formate 15,21-diacetate with the opposite configuration at C–15.

When steps (a) or (b) were repeated with other salts preferably lower fatty acid salts or benzoates, the equivalent 15-acylates were formed.

*Example V*

(a) 1.0 g. of the 3-formate 21-acetate of 15-bromo-$\Delta^{16}$-pregnene-3α,21-diol-20-one, obtained in accordance with Example III, was dissolved in 14 cc. of acetone, mixed with 4.0 g. of potassium acetate and the mixture was stirred for 20 hours at 50° C. Water was added and the precipitate was collected and washed to neutral, thus yielding the 3-formate 15,21-diacetate of $\Delta^{16}$-pregnene-3α,15,21-triol-20-one (0.2 g.) identical to the one obtained in accordance with Example IV.

(b) Repetition of this experiment using silver acetate instead of potassium acetate afforded the 3-formate 15,21-diacetate (0.2 g.) with the opposite configuration at C–15, identical to the one obtained in accordance with Example IV.

The following examples can be carried out with either of the two isomers obtained in accordance with Examples IV and V.

*Example VI*

The 3-formate 15,21-diacetate or other diacylate of $\Delta^{16}$-pregnene-3α,15,21-triol-20-one, obtained in accordance with either of the two methods described in Examples IV and V, or the free triol obtained by conventional saponification was dissolved in 30 cc. of ethyl acetate and hydrogenated at atmospheric pressure and room temperature under an atmosphere of hydrogen in the presence of 100 mg. of a 5% palladium-on-barium sulfate catalyst until the absorption of hydrogen ceased. The catalyst was filtered and the solution was concentrated to a small volume. The product crystallized upon cooling in an ice bath, thus giving the 3-formate 15,21-diacetate or other diacylate of pregnan-3α,15,21-triol-20-one or the free triol.

*Example VII*

1.0 g. of the 3-formate 15,21-diacetate of pregnane-3α,15,21-triol-20-one or the free 3-alcohol, obtained in accordance with Example VI, was dissolved in 300 cc. of xylene and 30 cc. of solvent was distilled in order to remove traces of moisture. 100 cc. of cyclohexanone was added and a further 30 cc. of solvent was distilled. 1.1 g. of aluminum isopropylate was added to the hot solution and the mixture was refluxed for 45 minutes. The mixture was cooled to 90° C., water was added and the organic solvents were removed by steam distillation. Salt was added to the cooled aqueous suspension, the precipitate was filtered and dried at 90° C. The solid was extracted with 300 cc. of hot acetone and the solution was evaporated to dryness, leaving as a residue the diacetate of pregnane-15,21-diol-3,20-dione.

The diacetate may also be subjected to conventional saponification to prepare the free pregnane-15,21-diol-3,20-dione and this compound may then be subjected to conventional esterification to prepare 15,21-diacylates of acids conventionally used for the esterification of steroid alcohols in the form of their acid anhydrides or acyl halides. In general, these acids may be classified as carboxylic acids of less than about 10 carbon atoms and especially hydrocarbon carboxylic acids, including carboxylic acids, such as cyclopentyl propionic, aromatic acids such as benzoic, 4-nitrobenzoic, simple aliphatic acids such as acetic, propionic and butyric acids and dicarboxylic acids such as succinic acids which may form either the mono or diesters. As may be understood, the acid grouping may be substituted, as for example, by nitro groups and/or halogen groups.

*Example VIII*

1.0 g. of the diacetate or other diacylate obtained in accordance with Example VII was dissolved in 40 cc. of acetic acid and mixed dropwise and under continuous stirring with a solution of 0.38 g. of bromine in 8 cc. of acetic acid. Water was added to the solution and the precipitate was filtered, washed to neutral and crystallized from methanol. The 4-bromo compound thus formed was dehydrobrominated in accordance with either of the two following methods.

(*a*) 1.0 g. of the 4-bromo compound dissolved in 10 cc. of dimethyl formamide was mixed with 0.25 g. of anhydrous lithium chloride and the mixture was heated for two hours at 100° C. under an atmosphere of nitrogen. The solution was diluted with 5 cc. of water and cooled, whereupon the diacetate or other diacylate of $\Delta^4$-pregnene-15,21-diol-3,20-dione crystallized from the solution. After filtering and washing, there was obtained 0.53 g. of crystals.

(*b*) 0.5 g. of the 4-bromo compound was dissolved in 80 cc. of 98% acetic acid. A mixture of 400 mg. of semicarbazide hydrochloride and 400 mg. of anhydrous sodium acetate was added to the solution which was then heated for two hours at 70° C. under an atmosphere of nitrogen. 5 cc. of pyruvic acid diluted with 10 cc. of water was added and the solution was kept for a further two hours at the same temperature. The cooled solution was diluted with ethyl acetate and washed with aqueous sodium hydroxide solution and with aqueous sodium chloride solution. Concentration and crystallization in an ice bath afforded 0.32 g. of the diacetate of $\Delta^4$-pregnene-15,21-diol-3,20-dione, identical to the one obtained in accordance with the method described under paragraph (*a*).

*Example IX*

0.5 g. of the diacetate or other diacylate of $\Delta^4$-pregnene-15,21-diol-3,20-dione was dissolved in 25 cc. of methanol and 0.25 g. of potassium hydroxide previously dissolved in 1 cc. of water was added under an atmosphere of nitrogen, at a temperature of 10° C. The mixture was stirred for one hour at the same temperature and then acidified with 0.5 cc. of acetic acid. The solution was evaporated to dryness under reduced pressure at a temperature between 30 and 40° C. Water was added to the residue and the solid precipitate was filtered, dried and crystallized from acetone, thus yielding 350 mg. of $\Delta^4$-pregnen-15,21-diol-3,20-dione.

We claim:

1. A method for the preparation of a compound selected from the group consisting of $\Delta^4$-pregnene-15,21-diol-3,20-dione and 15,21-diacetate thereof which comprises esterifying $\Delta^{16}$-pregnene-3α-ol-20-one with formic acid to form the 3-formate thereof, treating the 3-formate with isopropenyl acetate to form the 3-formate-20-acetate of $\Delta^{16,20}$-pregnadiene-3α,20-diol, reacting the diol with N-iodosuccinimide to form the 21 iodo derivative of the 3-formate of $\Delta^{16}$-pregnene-3α-ol-20-one, reacting the 21 iodo derivative with an alkali metal acetate to form the 3-formate 21-acetate of $\Delta^{16}$-pregnene-3α,21-diol-20-one, brominating this last-mentioned compound to form 15-bromo derivative of the 3-formate 21-acetate of $\Delta^{16}$-pregnene-3α,21-diol-20-one, treating the 15-bromo derivative with an acetate of a monovalent metal to form the corresponding 15-acetate, catalytically hydrogenating the 15-acetate to form the 3-formate 15,21-diacetate of pregnane-3α,15,21-triol-20-one, oxidizing the last-mentioned compound with an aluminum alkoxide in the presence of a hydrogen acceptor to form the 15,21-diacetate of pregnane-15,21-diol-3,20-dione, brominating this last-mentioned compound to form the corresponding 4-bromo derivative and dehydrobrominating the 4-bromo derivative.

2. A method for the preparation of the 3-formate 21-acetate of $\Delta^{16}$-pregnene-3α,21-diol-20-one, which comprises treating the 3-formate 20-acetate of $\Delta^{16,20}$-pregnadiene-3α,20-diol with N-iodosuccinimide and thereafter reacting the resulting iodo derivative with potassium acetate.

3. A method for the preparation of the 3-formate 15,21-diacetate of $\Delta^{16}$-pregnene-3α,15,21-triol-20-one which comprises brominating the 3-formate 21-acetate of $\Delta^{16}$-pregnene-3α,21-diol-20-one, and thereafter treating the 15-halo compound thus formed with an acetate of a monovalent metal.

4. The method of claim 3 wherein the acetate is potassium acetate.

5. The method of claim 3 wherein the acetate is silver acetate.

6. The 3-formate 21-acetate of $\Delta^{16}$-pregnene-3α,21-diol-20-one.

7. $\Delta^{16}$-pregnene-3α,15,21-triol-20-one.

8. The 3-formate 15,21-diacetate of $\Delta^{16}$-pregnene-3α,15,21-triol-20-one.

9. Pregnane-3α,15,21-triol-20-one.

10. The 3-formate 15,21-diacetate of pregnane-3α,15,21-triol-20-one.

11. Pregnane-15,21-diol-3,20-dione.

12. The diacetate of pregnane-15,21-diol-3,20-dione.

13. 4-bromo-pregnane-15,21-diol-3,20-dione.

14. $\Delta^4$-pregnene-15,21-diol-3,20-dione.

15. $\Delta^4$-pregnene-15α,21-diol-3,20-dione.

16. $\Delta^4$-pregnene-15β,21-diol-3,20-dione.

17. The diacetate of $\Delta^4$-pregnene-15β,21-diol-3,20-dione.

18. A compound having the following formula:

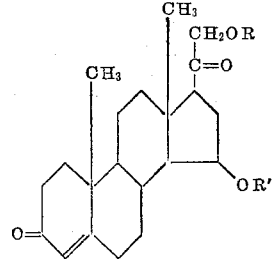

wherein R and R¹ are the same and are selected from the group consisting of hydrogen and hydrocarbon-carboxylic acyl containing less than nine carbon atoms.

19. A process for the production of 15,21-diacetate of pregnane-15,21-diol-3,20-dione comprising oxidizing the corresponding 3-formate 15,21-diacetate with aluminum isopropylate in the presence of a hydrogen acceptor.

References Cited in the file of this patent

UNITED STATES PATENTS 2,691,014    Moffett    Oct. 5, 1954